United States Patent
Okuyama et al.

(10) Patent No.: US 8,040,063 B2
(45) Date of Patent: Oct. 18, 2011

(54) BLUE PHOSPHOR, LIGHT-EMITTING DEVICE, AND PLASMA DISPLAY PANEL

(75) Inventors: Kojiro Okuyama, Nara (JP); Yayoi Kitamura, Osaka (JP); Seigo Shiraishi, Osaka (JP); Kazuhiko Sugimoto, Osaka (JP); Mituru Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/595,174

(22) PCT Filed: Mar. 25, 2008

(86) PCT No.: PCT/JP2008/000721
§ 371 (c)(1),
(2), (4) Date: Oct. 8, 2009

(87) PCT Pub. No.: WO2008/136170
PCT Pub. Date: Nov. 13, 2008

(65) Prior Publication Data
US 2010/0141113 A1 Jun. 10, 2010

(30) Foreign Application Priority Data
Apr. 18, 2007 (JP) .................................. 2007-109837

(51) Int. Cl.
*H01J 1/62* (2006.01)
*H01J 63/04* (2006.01)
(52) U.S. Cl. .. 313/582; 313/486; 313/503; 252/301.4 R; 252/301.5
(58) Field of Classification Search .................. 313/486, 313/503, 582–587; 252/301.4 R, 301.5
See application file for complete search history.

(56) References Cited

U.S. PATENT DOCUMENTS

| | | | |
|---|---|---|---|
| 6,254,805 B1 * | 7/2001 | Potter | 252/301.4 R |
| 7,300,605 B2 * | 11/2007 | Fukuta et al. | 252/301.4 R |
| 2005/0046330 A1 | 3/2005 | Okuyama et al. | |
| 2005/0062417 A1 * | 3/2005 | Okuyama et al. | 313/582 |
| 2006/0091360 A1 | 5/2006 | Hirayama et al. | |

FOREIGN PATENT DOCUMENTS

| | | |
|---|---|---|
| JP | 3-177491 A | 8/1991 |
| JP | 6-029418 B2 | 4/1994 |
| JP | 10-330746 A | 12/1998 |
| JP | 2000-026855 A | 1/2000 |

(Continued)

OTHER PUBLICATIONS

Co-pending U.S. Appl. No. 12/595,159, filed Oct. 9, 2009.

(Continued)

*Primary Examiner* — Joseph L Williams
*Assistant Examiner* — Kevin Quarterman
(74) *Attorney, Agent, or Firm* — Hamre, Schumann, Mueller & Larson, P.C.

(57) ABSTRACT

The present invention provides a blue phosphor that exhibits high luminance and shows less luminance degradation during driving of a light-emitting device. The present invention is a blue phosphor represented by the general formula $aBaO \cdot bSrO \cdot (1-a-b)EuO \cdot cMgO \cdot dAlO_{3/2} \cdot eWO_3$, where $0.70 \leq a \leq 0.95$, $0 \leq b \leq 0.15$, $0.95 \leq c \leq 1.15$, $9.00 \leq d \leq 11.00$, $0.001 \leq e \leq 0.100$, and $a+b \leq 0.97$ are satisfied. In this blue phosphor, two peaks whose tops are located in a range of diffraction angle $2\theta = 13.0$ to $13.6$ degrees are present in an X-ray diffraction pattern obtained by measurement on the blue phosphor using an X-ray with a wavelength of 0.774 Å.

7 Claims, 2 Drawing Sheets

FOREIGN PATENT DOCUMENTS

| | | |
|---|---|---|
| JP | 2000-034478 A | 2/2000 |
| JP | 2002-080843 A | 3/2002 |
| JP | 2003-147352 A | 5/2003 |
| JP | 2005-314464 A | 11/2005 |
| JP | 2005-340155 A | 12/2005 |
| JP | 2006-290974 A | 10/2006 |
| WO | WO 2004/087833 A | 10/2004 |

OTHER PUBLICATIONS

Ryu, et al., "Blue-Luminescence of Nanocrystalline $MWO_4$ (M = Ca, Sr, Ba, Pb) Phosphors Synthesized via a Citrate Complex Route Assisted by Microwave Irradiation", Electrochemical and Solid-State Letters, vol. 8, No. 5, 2005, pp. DI5-D18.

* cited by examiner

BLUE PHOSPHOR, LIGHT-EMITTING DEVICE, AND PLASMA DISPLAY PANEL

TECHNICAL FIELD

The present invention relates to a blue phosphor that is used in a plasma display panel (PDP), a mercury-free fluorescent lamp, or the like, and to a light-emitting device (particularly a PDP).

BACKGROUND ART

Various aluminate phosphors have been put to practical use as phosphors for energy-saving fluorescent lamps. Examples of blue phosphors include $(Ba,Sr)MgAl_{10}O_{17}$:Eu (BAM:Eu), and examples of green phosphors include $CeMgAl_{11}O_{19}$:Tb and $BaMgAl_{10}O_{17}$:Eu,Mn.

In recent years, BAM:Eu, which exhibits high luminance under vacuum-ultraviolet excitation, has been used as a blue phosphor for PDPs.

However, when a light-emitting device using the blue phosphor BAM:Eu is driven for a long period of time, the luminance is degraded significantly. Hence, for use in a light-emitting device, particularly in a PDP, there is a strong demand for a phosphor that shows less luminance degradation even after long-time driving.

The mechanism of luminance degradation of the blue phosphor BAM:Eu has not been clarified sufficiently. The luminance degradation of the blue phosphor is likely to occur because of the entry of moisture and impurity gas as well as the heat treatment in the process of manufacturing the light-emitting device, and of the vacuum ultraviolet light irradiation during driving of the light-emitting device.

In order to prevent the luminance degradation, there have been proposed a method in which gadolinium is added to a phosphor (see JP 6(1994)-29418 B, for example), a method in which a phosphor is coated with silicate of divalent metal such as alkaline earth metal (see JP 2000-34478 A, for example), and a method in which a phosphor is coated with an antimony oxide (see JP 10(1998)-330746 A, for example).

However, light-emitting devices using the phosphors according to these conventional methods, in most cases, cannot suppress the luminance degradation of the phosphor during driving while maintaining high luminance.

DISCLOSURE OF THE INVENTION

The present invention has been made in order to solve the above-mentioned conventional problems, and it is an object of the present invention to provide a blue phosphor that exhibits high luminance and shows less luminance degradation during driving of a light-emitting device. It is a further object of the present invention to provide a long-life light-emitting device, particularly a PDP, using the blue phosphor.

The present invention is a blue phosphor represented by the general formula $aBaO \cdot bSrO \cdot (1-a-b)EuO \cdot cMgO \cdot dAlO_{3/2} \cdot eWO_3$, where $0.70 \leq a \leq 0.95$, $0 \leq b \leq 0.15$, $0.95 \leq c \leq 1.15$, $9.00 \leq d \leq 11.00$, $0.001 \leq e \leq 0.100$, and $a+b \leq 0.97$ are satisfied. In this blue phosphor, two peaks whose tops are located in a range of diffraction angle $2\theta = 13.0$ to 13.6 degrees are present in an X-ray diffraction pattern obtained by measurement on the blue phosphor using an X-ray with a wavelength of 0.774 Å. In this blue phosphor, it is preferable that $0.80 \leq a \leq 0.95$, $0 \leq b \leq 0.05$, $1.00 \leq c \leq 1.15$, $9.50 \leq d \leq 10.00$, and $0.005 \leq e \leq 0.020$ are satisfied. It also is preferable that one of the two peaks has its top in a range of diffraction angle $2\theta = 13.0$ to 13.2 degrees in the X-ray diffraction pattern obtained by measurement on the blue phosphor using an X-ray with a wavelength of 0.774 Å.

In another aspect, the present invention is a light-emitting device including a phosphor layer containing the blue phosphor, and a suitable example of the light-emitting device is a plasma display panel.

The plasma display panel includes, for example: a front panel; a back panel that is arranged to face the front panel; barrier ribs that define a clearance between the front panel and the back panel; a pair of electrodes that are disposed on the back panel or the front panel; an external circuit that is connected to the electrodes; a discharge gas that is present at least between the electrodes and contains xenon that generates a vacuum ultraviolet ray by applying a voltage between the electrodes through the external circuit; and phosphor layers that emit visible light induced by the vacuum ultraviolet ray, the phosphor layers include a blue phosphor layer, and the blue phosphor layer contains the blue phosphor.

The present invention can provide a blue phosphor that exhibits high luminance and shows less luminance degradation during manufacturing and driving of the light-emitting device. The present invention also can provide a long-life light-emitting device, such as a PDP, in which the luminance is not degraded even after long-time driving.

BEST MODE FOR CARRYING OUT THE INVENTION

Figure 1:
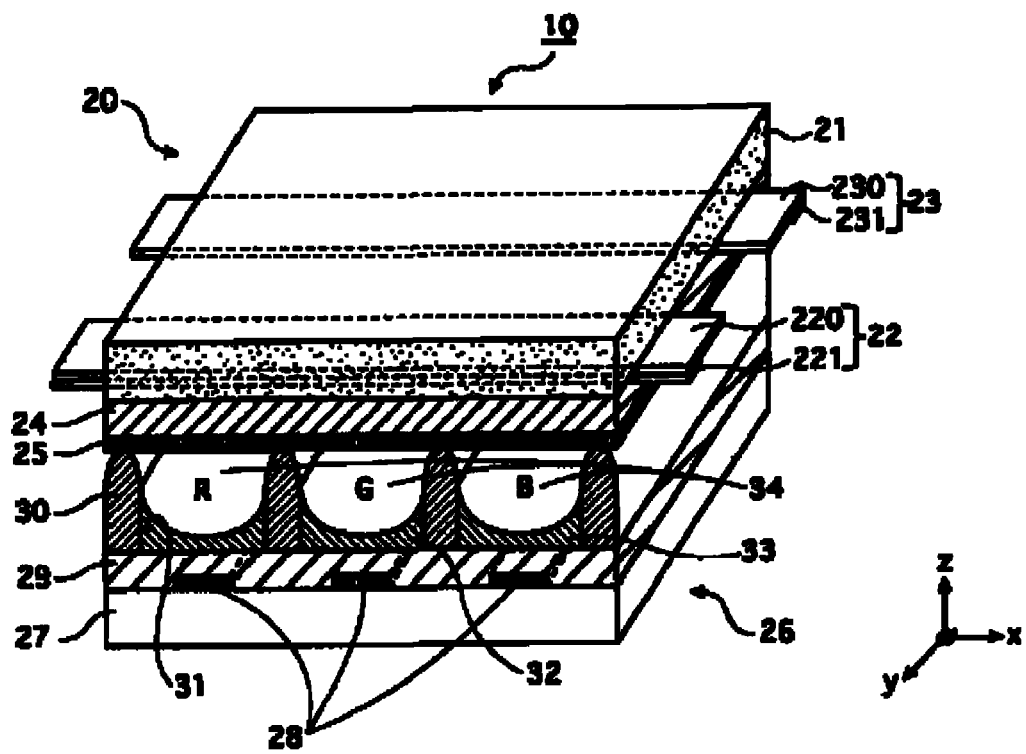
FIG. 1 is a schematic cross-sectional view showing a structure of a PDP of the present invention.

Hereinafter, embodiments of the present invention will be described in detail.

<Composition of Blue Phosphor>

The blue phosphor of the present invention is represented by the general formula $aBaO \cdot bSrO \cdot (1-a-b)EuO \cdot cMgO \cdot dAlO_{3/2} \cdot eWO_3$, where $0.70 \leq a \leq 0.95$, $0 \leq b \leq 0.15$, $0.95 \leq c \leq 51.15$, $9.00 \leq d \leq 11.00$, $0.001 \leq e \leq 0.100$, and $a+b \leq 0.97$ are satisfied. With respect to coefficients a, b, c, d and e, preferable ranges are $0.80 \leq a \leq 0.95$, $0 \leq b \leq 0.05$, $1.00 \leq c \leq 1.15$, $9.50 \leq d \leq 10.00$, and $0.005 \leq e \leq 0.020$, respectively, from the viewpoints of luminance and resistance to luminance degradation.

<Characteristics Relating to X-Ray Diffraction of Blue Phosphor>

The blue phosphor of the present invention is characterized in that two peaks whose tops are located in a range of diffraction angle $2\theta = 13.0$ to 13.6 degrees are present in an X-ray diffraction pattern obtained by measurement on the blue phosphor using an X-ray with a wavelength of 0.774 Å. From the viewpoints of luminance and resistance to luminance degradation, it is preferable that one of the two peaks has its top in a range of diffraction angle $2\theta = 13.0$ to 13.2 degrees in the X-ray diffraction pattern obtained by measurement on the blue phosphor using an X-ray with a wavelength of 0.774 Å.

The present inventors have found from their extensive experimental studies that a blue phosphor having the above composition and having the above characteristics relating to the X-ray diffraction pattern can be a phosphor that exhibits high luminance and shows less luminance degradation during manufacturing and driving of a light-emitting device. With respect to the conventional blue phosphor BAM:Eu, the number of peaks whose tops are located in the above range of diffraction angle 2θ is only one. The reason why the blue phosphor having the above characteristics relating to the X-ray diffraction pattern has excellent light-emitting property is not clear, but it is presumed as follows. In the experiments conducted by the present inventors, a phosphor was subjected to firing under unique conditions as described later. It is considered that the lattice constant of the phosphor changes during this firing, which results in an improvement in the light-emitting property (resistance to luminance degradation) of the phosphor.

In the present invention, in order to distinguish a peak from a change in signal intensity due to noise and the like in the X-ray diffraction pattern, among the changes in signal intensity, a change in signal intensity having an intensity of at least one tenth of a peak present in the vicinity of a diffraction angle 2θ=13.4 degrees is recognized as a peak. In the present invention, the phrase "two peaks are present" refers to the case where the sign of the differential value at each angle point constituting the spectrum is reversed three times within a predetermined range of diffraction angle, while ignoring noise. Therefore, here, even in the case where two peaks overlap so as to constitute one bimodal peak, it is considered as "two peaks are present".

<Powder X-Ray Diffraction Measurement>

Next, a powder X-ray diffraction measurement on the blue phosphor of the present invention will be described.

For the powder X-ray diffraction measurement, for example, BL19B2 powder X-ray diffraction equipment (Debye-Scherrer optical system using an imaging plate; hereinafter referred to as BL19 diffraction equipment) in the large-scale synchrotron radiation facility, SPring 8 is used. Phosphor powder is packed tightly into a Lindemann glass capillary with an internal diameter of 200 μm. The incident X-ray wavelength is set to approximately 0.774 Å using a monochromator. While a sample is rotated with a goniometer, the diffraction intensity is recorded on the imaging plate. The measuring time is to be determined, paying attention to keep the imaging plate unsaturated. The measuring time is, for example, 5 minutes. The imaging plate is developed and an X-ray diffraction spectrum thereon is read out.

It should be noted that an error from the zero point when the data is read out from the developed imaging plate is approximately 0.03 in terms of diffraction angle 2θ.

An accurate incident X-ray wavelength is confirmed using a $CeO_2$ powder (SRM No. 674a) of NIST (National Institute of Standards and Technology) whose lattice constant is 5.4111 Å. The data measured on the $CeO_2$ powder is subjected to Rietveld analysis while varying only the lattice constant (a-axis length). The actual X-ray wavelength λ is calculated based on the difference between the value a' obtained for the predetermined X-ray wavelength λ' and the actual value (a=5.4111 Å) from the following formula.

$$\lambda = a\lambda'/a'$$

For the Rietveld analysis, RIETAN-2000 program (Rev. 2.3.9 or later; hereinafter referred to as RIETAN) is used (see NAKAI Izumi, IZUMI Fujio, "Funmatsu X-sen kaiseki-no-jissai—Rietveld hou nyumon" (Practice of powder X-ray analysis—introduction to Rietveld method), Discussion Group of X-Ray Analysis, the Japan Society for Analytical Chemistry, Asakura Publishing, 2002, and http://homepage.mac.com/fujioizumi/).

It should be noted that X-ray diffraction is a phenomenon that is observed when a crystal lattice, incidence of X-ray, and a geometry of diffraction satisfy the Bragg's condition:

$$2d \sin \theta = n\lambda$$

Though the spectrum can be observed using a commonly available X-ray diffractometer, the diffraction profile observed has some differences because the observed strength depends on the incident X-ray wavelength.

<Manufacturing Method of Phosphor>

Hereinafter, the method of manufacturing the phosphor of the present invention will be described. The method of manufacturing the phosphor of the present invention is not limited to the method described below.

As a barium source material, a barium compound that can be converted into barium oxide by firing, such as barium hydroxide, barium carbonate, barium nitrate, barium halide, and barium oxalate, each having high purity (purity of 99% or more), may be used. Barium oxide having high purity (purity of 99% or more) also may be used.

As a strontium source material, a strontium compound that can be converted into strontium oxide by firing, such as strontium hydroxide, strontium carbonate, strontium nitrate, strontium halide, and strontium oxalate, each having high purity (purity of 99% or more), may be used. Strontium oxide having high purity (purity of 99% or more) also may be used.

As a europium source material, a europium compound that can be converted into europium oxide by firing, such as europium hydroxide, europium carbonate, europium nitrate, europium halide, and europium oxalate, each having high purity (purity of 99% or more), may be used. Europium oxide having high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, and basic magnesium carbonate, each having high purity (purity of 99% or more), may be used. Magnesium oxide having high purity (purity of 99% or more) also may be used.

As an aluminum source material, an aluminum compound that is converted into alumina by firing, such as aluminum hydroxide, aluminum nitrate, and aluminum halide, each having high purity (purity of 99% or more), may be used. Alumina having high purity (purity of 99.9% or more) also may be used.

As a tungsten source material, various source materials that can be converted into oxides may be used in the same way.

The blue phosphor is manufactured by mixing the above source materials and firing the mixed powder. The method of mixing the source materials may be wet mixing in a solution or dry mixing of dry powders. A ball mill, a stirred media mill, a planetary mill, a vibration mill, a jet mill, a V-type mixer, an agitator, and the like, which are in general industrial use, may be used. Since coarse particles in the source materials adversely affect the light-emitting property, it is preferable that the particles are classified to improve particle size uniformity.

Firing of the mixed powder is carried out, for example, in a mixed gas containing hydrogen, nitrogen and oxygen at 900 to 1600° C. for 1 to 50 hours. In the mixed gas, the concentration of hydrogen may be 0.1 to 10% by volume and the partial pressure of oxygen may be adjusted to approximately $10^{-12}$ to $10^{-7}$. By firing the mixed powder under these unique conditions, a blue phosphor having the above-mentioned characteristics relating to the X-ray diffraction pattern can be obtained efficiently.

As a furnace to be used for the firing, furnaces that are in general industrial use may be used. A gas furnace or an electric furnace of the batch type or continuous type such as a pusher furnace may be used.

When a hydroxide, a carbonate, a nitrate, a halide, an oxalate or the like that can be converted into oxide by firing is used as a source material, it is preferable that pre-firing is carried out within a temperature range of 800 to 1500° C. before main firing. A flux, such as material fluoride, preferably is added in order to accelerate the reaction.

The particle size distribution and flowability of the phosphor powder can be adjusted by crushing the obtained phosphor powder again using a ball mill, a jet mill, or the like, and further by washing or classifying it, if necessary.

<Uses of Blue Phosphor>

A light-emitting device exhibiting high luminance and resistance to luminance degradation can be constructed by applying the blue phosphor of the present invention to a light-emitting device having a phosphor layer. Specifically, for a light-emitting device having a phosphor layer in which BAM:Eu is used, BAM:Eu is replaced with the blue phosphor of the present invention, while a light-emitting device may be constructed according to a known method. It also is possible to construct a light-emitting device in which the phosphor of the present invention and a light-emitting diode (LED) chip are used in combination. Examples of the light-emitting device include a PDP, a fluorescent panel, and a fluorescent lamp, and among them, a PDP is suitable.

Hereinafter, an embodiment (the PDP of the present invention) in which the blue phosphor of the present invention is applied to a PDP will be described with an example of an AC surface-discharge type PDP. FIG. 1 is a cross-sectional perspective view showing the basic structure of an AC surface-discharge type PDP 10. It should be noted that the PDP shown here is illustrated for convenience with a size that is appropriate for a specification of 1024×768 pixels, which is the 42-inch class, and the present invention may be applied to other sizes and specifications as well.

As illustrated in FIG. 1, this PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of approximately 30 μm covering the display electrodes, and a protective layer 25 having a thickness of approximately 1.0 μm provided on the front-side dielectric layer 24.

The above display electrode includes a strip-shaped transparent electrode 220 (230) having a thickness of 0.1 μm and a width of 150 μm, and a bus line 221 (231) having a thickness of 7 μm and a width of 95 μm and laid on the transparent electrode. A plurality of pairs of the display electrodes are disposed in the y-axis direction, where the x-axis direction is a longitudinal direction.

The display electrodes (X-electrode 23, Y-electrode 22) of each pair are connected electrically to a panel drive circuit (not shown) respectively in the vicinity of the ends of the width direction (y-axis direction) of the front panel glass 21. It should be noted that the Y-electrodes 22 are connected collectively to the panel drive circuit and the X-electrodes 23 each are connected independently to the panel drive circuit. When the Y-electrodes 22 and the certain X-electrodes 23 are fed using the panel drive circuit, a surface discharge (sustained discharge) is generated in the gap (approximately 80μ) between the X-electrode 23 and the Y-electrode 22. The X-electrode 23 also can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with the side walls of two adjacent barrier ribs 30 and with the back-side dielectric layer 29 between the adjacent barrier ribs 30, and repeatedly are disposed in sequence in the x-axis direction.

The blue phosphor layer (B) contains the above-mentioned blue phosphor of the present invention. On the other hand, the red phosphor layer and the green phosphor layer contain commonly-used phosphors. Examples of the red phosphor include $(Y,Gd)BO_3:Eu$ and $Y_2O_3:Eu$, and examples of the green phosphor include $Zn_2SiO_4:Mn$, $YBO_3:Tb$, and $(Y,Gd)BO_3:Tb$.

Each phosphor layer can be formed by applying a phosphor ink in which phosphor particles are dissolved to the barrier ribs 30 and the back-side dielectric layer 29 by a known applying method such as a meniscus method and a line jet method, and drying and firing them (e.g., at 500° C., for 10 minutes). The above-mentioned phosphor ink can be prepared, for example, by mixing 30% by mass of a blue phosphor having a volume average particle diameter of 2 μm, 4.5% by mass of ethyl cellulose with a weight average molecular weight of approximately 200,000, and 65.5% by mass of butyl carbitol acetate. In this regard, it is preferable that the viscosity thereof is adjusted eventually to approximately 2000 to 6000 cps (2 to 6 Pas), because the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of approximately 150 μm and a width of approximately 40 μm, and the longitudinal direction is in the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (approximately 150 μm). A plurality of address electrodes 28 each are connected independently to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member.

An enclosed space between the front panel 20 and the back panel 26, which has been bonded and sealed with the frit glass sealing portion, is filled with a discharge gas composed of a rare gas such as He, Xe and Ne at a predetermined pressure (ordinarily approximately $6.7 \times 10^4$ to $1.0 \times 10^5$ Pa).

It should be noted that a space corresponding to a space between two adjacent barrier ribs 30 is a discharge space 34. A region where a pair of display electrodes intersect with one address electrode 28 with the discharge space 34 disposed therebetween corresponds to a cell used for displaying an image. It should be noted that in this embodiment, the cell pitch in the x-axis direction is set to approximately 300 μm and the cell pitch in the y-axis direction is set to approximately 675 μm.

When the PDP 10 is driven, an address discharge is generated by applying a pulse voltage to the certain address electrode 28 and the certain X-electrode 23 by the panel drive circuit, and after that, a sustained discharge is generated by applying a pulse between a pair of display electrodes (X-electrode 23, Y-electrode 22). The phosphors contained in the phosphor layers 31 to 33 are allowed to emit visible light using the ultraviolet ray with a short wavelength (a resonance line with a central wavelength of approximately 147 nm and a molecular beam with a central wavelength of 172 nm) thus generated. Thereby, a prescribed image can be displayed on the front panel side.

The blue phosphor of the present invention can be applied to a fluorescent panel including a fluorescent layer that is excited by an ultraviolet ray and then emits light according to a known manner. This fluorescent panel has good luminance as well as an excellent resistance to luminance degradation compared to the conventional fluorescent panels. This fluorescent panel can be used, for example, as a backlight of a liquid crystal display device.

The blue phosphor of the present invention can be applied also to a fluorescent lamp (e.g., electrodeless fluorescent lamp, xenon fluorescent lamp, fluorescent mercury lamp) according to a known manner. This fluorescent lamp has good luminance as well as an excellent resistance to luminance degradation compared to the conventional fluorescent lamps.

Hereinafter, an embodiment of the present invention will be described in more detail with reference to Examples. The present invention is not limited by these Examples.

<Preparation of Phosphor Samples of Examples>

As starting materials, $BaCO_3$, $SrCO_3$, $MgCO_3$, $Al_2O_3$, $AlF_3$, $Eu_2O_3$, and $WO_3$ were used. These materials were weighed according to the compositions shown in Table 1, and wet-mixed in pure water using a ball mill. After these mixtures were dried, they were pre-fired in an air atmosphere at 1200 to 1500° C. for 4 hours. The obtained fired mixtures were subjected to main firing at 1200 to 1500° C. for 4 hours, and thus phosphors (Sample Nos. 4 to 14) were obtained. It should be noted that the main firing was carried out by employing a unique firing method, in which the firing was carried out under a mixed gas atmosphere containing hydrogen, nitrogen and oxygen (in which the concentration of hydrogen was 3% by volume, and the partial pressure of oxygen was approximately $10^{-12}$ to $10^{-7}$ at a peak temperature), and in the process of temperature dropping, introduction of hydrogen was stopped at a temperature of 800 to 1000° C.

<Preparation of Phosphor Samples of Comparative Examples>

Phosphors of Sample Nos. 1 to 3, 15 and 16 were prepared in the same manner as in the above-mentioned phosphor samples of Examples, except that the main firing was carried out in a typical reducing atmosphere using nitrogen containing 3% by volume of hydrogen (in which the partial pressure of oxygen was approximately $10^{-15}$ at a peak temperature) without using $WO_3$. A phosphor of Sample No. 17 was prepared in the same manner as in the above-mentioned phosphor samples of Examples, except that the main firing was carried out in a typical reducing atmosphere using nitrogen containing 3% by volume of hydrogen (in which the partial pressure of oxygen was approximately $10^{-15}$ at a peak temperature).

<Powder X-Ray Diffraction Measurement>

Figure 2:
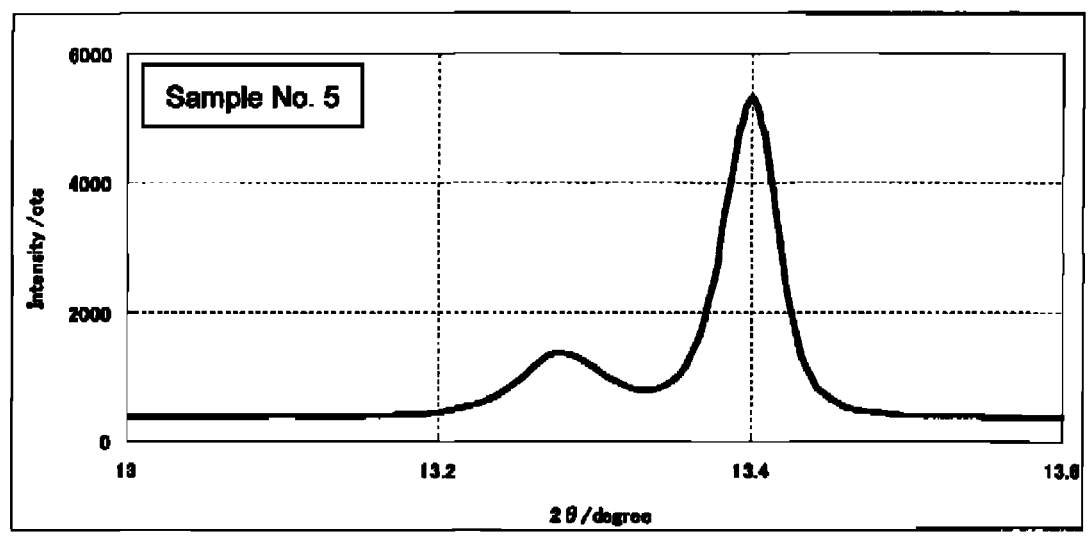
FIG. 2 shows a powder X-ray diffraction pattern of Sample No. 5 measured as Example.
Figure 3:
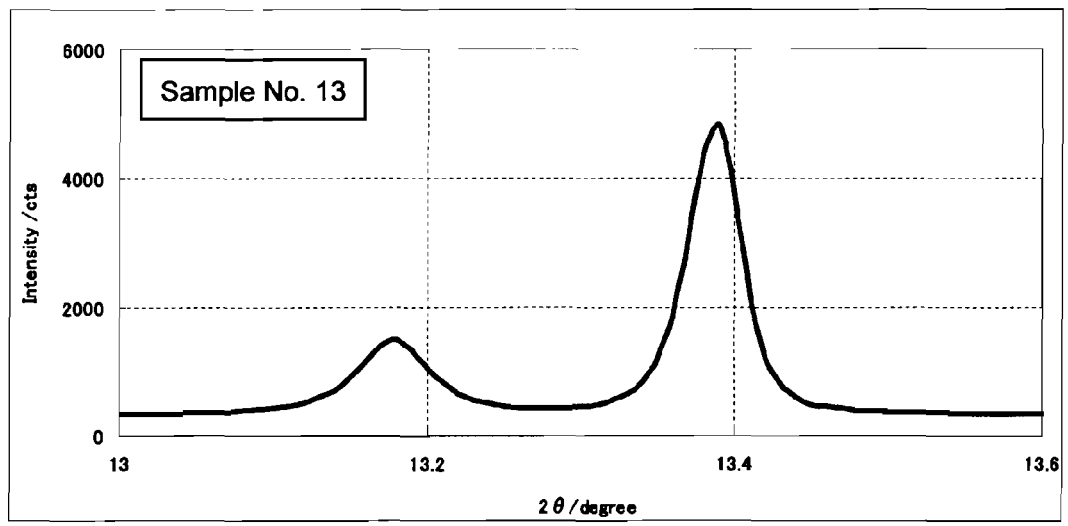
FIG. 3 shows a powder X-ray diffraction pattern of Sample No. 13 measured as Example.
Figure 4:
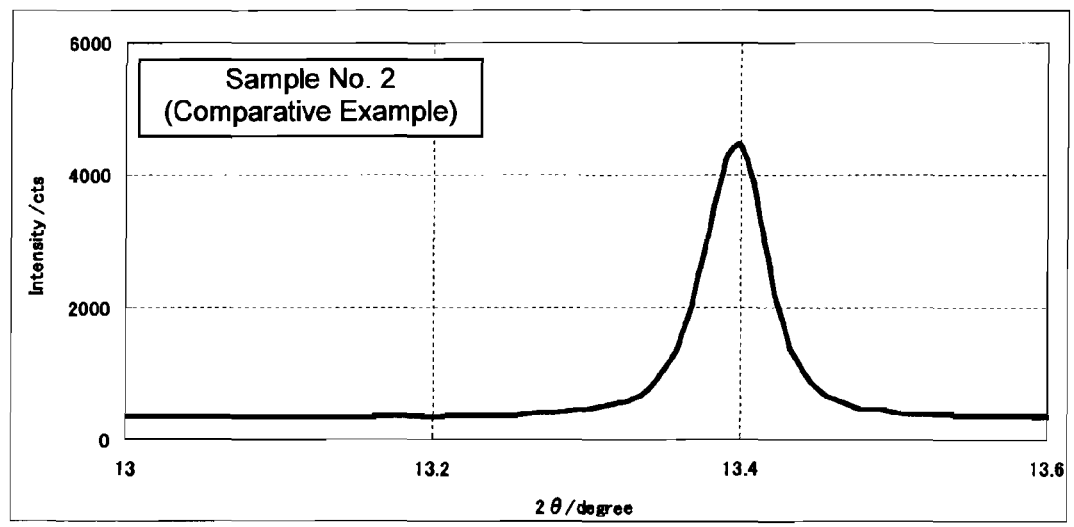
FIG. 4 shows a powder X-ray diffraction pattern of Sample No. 2 measured as Comparative Example.

The X-ray diffraction patterns of the phosphor samples of Examples and Comparative Examples were measured by the above-mentioned method, using BL19 diffraction equipment in the large-scale synchrotron radiation facility, SPring 8. Table 1 shows, for each of the phosphor samples, the number of peaks whose tops are located in the range of diffraction angle 2θ=13.0 to 13.6 degrees in the obtained X-ray diffraction pattern and the position(s) of the peak(s), as well as the composition of the sample. The samples marked with an asterisk in Table 1 are the phosphors of Comparative Examples. FIGS. 2 to 4 show examples of the obtained X-ray diffraction patterns (of Samples Nos. 2, 5 and 13).

<Measurement of Luminance>

The measurement of luminance was carried out by irradiating the phosphors with a vacuum ultraviolet ray with a wavelength of 146 nm under vacuum and measuring light-emission in the visible region. The luminance is luminance Y in the XYZ color coordinate system of International Commission on Illumination and was evaluated as a value relative to the standard sample BAM:Eu ($Ba_{0.9}MgAl_{10}O_{17}$:$Eu_{0.1}$). Table 1 shows the results.

TABLE 1

| Sample No. | a | b | c | d | e | Number of peaks | Peak position (degrees) | Y (%) |
|---|---|---|---|---|---|---|---|---|
| *1  | 0.65 | 0.25 | 0.90 | 8.00  | 0     | 1 | 13.40        | 70  |
| *2  | 0.70 | 0.20 | 1.00 | 10.00 | 0     | 1 | 13.38        | 85  |
| *3  | 0.97 | 0    | 1.20 | 12.00 | 0     | 1 | 13.34        | 75  |
| 4   | 0.70 | 0.15 | 0.95 | 9.00  | 0.001 | 2 | 13.30, 13.42 | 100 |
| 5   | 0.90 | 0.05 | 1.15 | 10.00 | 0.100 | 2 | 13.25, 13.40 | 102 |
| 6   | 0.90 | 0.05 | 1.15 | 11.00 | 0.010 | 2 | 13.28, 13.42 | 105 |
| 7   | 0.85 | 0.05 | 1.00 | 9.50  | 0.005 | 2 | 13.30, 13.40 | 115 |
| 8   | 0.80 | 0.05 | 1.15 | 10.00 | 0.020 | 2 | 13.28, 13.40 | 112 |
| 9   | 0.90 | 0    | 1.00 | 10.00 | 0.010 | 2 | 13.18, 13.38 | 120 |
| 10  | 0.90 | 0.02 | 1.15 | 9.70  | 0.010 | 2 | 13.18, 13.40 | 118 |
| 11  | 0.80 | 0.05 | 1.00 | 9.50  | 0.005 | 2 | 13.18, 13.42 | 117 |
| 12  | 0.95 | 0    | 1.00 | 10.00 | 0.020 | 2 | 13.16, 13.36 | 116 |
| 13  | 0.91 | 0    | 1.00 | 10.00 | 0.010 | 2 | 13.16, 13.38 | 125 |
| 14  | 0.90 | 0    | 1.00 | 9.80  | 0.005 | 2 | 13.18, 13.38 | 122 |
| *15 | 0.80 | 0.10 | 1.00 | 12.00 | 0     | 1 | 13.40        | 88  |
| *16 | 0.80 | 0.10 | 1.00 | 10.00 | 0     | 1 | 13.40        | 92  |
| *17 | 0.70 | 0.15 | 0.95 | 9.00  | 0.001 | 1 | 13.44        | 90  |

As is clear from Table 1, phosphors, each having a composition falling within the composition range of the present invention and having two peaks whose tops are located in the range of diffraction angle 2θ=13.0 to 13.6 degrees, exhibit high luminance under vacuum-ultraviolet excitation. Particularly, phosphors (Sample Nos. 7 to 14) that satisfy 0.80≦a≦0.95, 0≦b≦0.05, 1.00≦c≦1.15, 9.50≦d≦10.00, and 0.005≦e≦0.020 exhibit high luminance. Furthermore, phosphors (Sample Nos. 9 to 14), each having two peaks, one of which has its top in the range of diffraction angle 2θ=13.0 to 13.2 degrees, exhibit particularly high luminance.

<Panel Luminance and Luminance Degradation>

PDPs having the structure of FIG. 1 were manufactured according to the above-described embodiment of an AC surface-discharge type PDP, using the blue phosphors obtained in the same manner as in the phosphors of Samples Nos. 1 to 17. The initial luminance of each of the PDPs thus manufactured (as relative values with respect to that of the standard sample BAM:Eu) was measured. Each panel was subjected to accelerated driving (equivalent to 1000 hours of actual driving), and the luminance after the driving was measured to calculate luminance degradation (%). Each panel displayed a fixed image with one color of blue. Table 2 shows the results. The samples marked with an asterisk in Table 2 are the phosphors of Comparative Examples.

TABLE 2

| Sample No. | a | b | c | d | e | Number of peaks | Peak position (degrees) | Luminance (%) | Luminance degradation (%) |
|---|---|---|---|---|---|---|---|---|---|
| *18 | 0.65 | 0.25 | 0.90 | 8.00 | 0 | 1 | 13.40 | 62 | 18 |
| *19 | 0.70 | 0.20 | 1.00 | 10.00 | 0 | 1 | 13.38 | 80 | 21 |
| *20 | 0.97 | 0 | 1.20 | 12.00 | 0 | 1 | 13.34 | 71 | 16 |
| 21 | 0.70 | 0.15 | 0.95 | 9.00 | 0.001 | 2 | 13.30, 13.42 | 98 | 9 |
| 22 | 0.90 | 0.05 | 1.15 | 10.00 | 0.100 | 2 | 13.25, 13.40 | 100 | 7 |
| 23 | 0.90 | 0.05 | 1.15 | 11.00 | 0.010 | 2 | 13.28, 13.42 | 108 | 5 |
| 24 | 0.85 | 0.05 | 1.00 | 9.50 | 0.005 | 2 | 13.30, 13.40 | 111 | 4 |
| 25 | 0.80 | 0.05 | 1.15 | 10.00 | 0.020 | 2 | 13.28, 13.40 | 112 | 2 |
| 26 | 0.90 | 0 | 1.00 | 10.00 | 0.010 | 2 | 13.18, 13.38 | 117 | 4 |
| 27 | 0.90 | 0.02 | 1.15 | 9.70 | 0.010 | 2 | 13.18, 13.40 | 118 | 2 |
| 28 | 0.80 | 0.05 | 1.00 | 9.50 | 0.005 | 2 | 13.18, 13.42 | 121 | 3 |
| 29 | 0.95 | 0 | 1.00 | 10.00 | 0.020 | 2 | 13.16, 13.36 | 112 | 5 |
| 30 | 0.91 | 0 | 1.00 | 10.00 | 0.010 | 2 | 13.16, 13.38 | 122 | 1 |
| 31 | 0.90 | 0 | 1.00 | 9.80 | 0.005 | 2 | 13.18, 13.38 | 117 | 2 |
| *32 | 0.80 | 0.10 | 1.00 | 12.00 | 0 | 1 | 13.40 | 80 | 14 |
| *33 | 0.80 | 0.10 | 1.00 | 10.00 | 0 | 1 | 13.40 | 90 | 15 |
| *34 | 0.70 | 0.15 | 0.95 | 9.00 | 0.001 | 1 | 13.44 | 85 | 14 |

As is clear from Table 2, it is confirmed that when phosphors, each having a composition falling within the composition range of the present invention and having two peaks whose tops are located in the range of diffraction angle $2\theta=13.0$ to 13.6 degrees, are used, the values of the panel initial luminance are high and luminance degradation is inhibited significantly. Particularly, when phosphors (Sample Nos. 24 to 31) that satisfy $0.80 \leqq a \leqq 0.95$, $0 \leqq b \leqq 0.05$, $1.00 \leqq c \leqq 1.15$, $9.50 \leqq d \leqq 10.00$, and $0.005 \leqq e \leqq 0.020$ are used, excellent luminance and resistance to luminance degradation are obtained. Furthermore, when phosphors (Samples 26 to 31), each having two peaks, one of which has its top in the range of diffraction angle $2\theta=13.0$ to 13.2 degrees, are used, particularly excellent luminance and resistance to luminance degradation are obtained. In contrast, when the samples of Comparative Examples, each in which at least one of the coefficients a, b, c, d and e or the number of specific peaks in the powder X-ray diffraction measurement is outside the respective ranges specified in the present invention, are used, the values of the initial luminance are low and the luminance is degraded significantly during driving of the PDP.

INDUSTRIAL APPLICABILITY

The blue phosphor of the present invention can be used in light-emitting devices, among them in particular, PDPs. Furthermore, the blue phosphor of the present invention also can be applied to the uses of fluorescent lamps such as an electrodeless fluorescent lamp, a xenon fluorescent lamp, and a fluorescent mercury lamp, fluorescent panels mainly used for a backlight of a liquid crystal display device, and the like.

The invention claimed is:

1. A blue phosphor represented by the general formula $aBaO \cdot bSrO \cdot (1-a-b)EuO \cdot cMgO \cdot dAlO_{3/2} \cdot eWO_3$, where $0.70 \leqq a \leqq 0.95$, $0 \leqq b \leqq 0.15$, $0.95 \leqq c \leqq 1.15$, $9.00 \leqq d \leqq 11.00$, $0.001 \leqq e \leqq 0.100$, and $a+b \leqq 0.97$ are satisfied,
wherein two peaks whose tops are located in a range of diffraction angle $2\theta=13.0$ to 13.6 degrees are present in an X-ray diffraction pattern obtained by measurement on the blue phosphor using an X-ray with a wavelength of 0.774 Å.

2. The blue phosphor according to claim 1, wherein $0.80 \leqq a \leqq 0.95$, $0 \leqq b \leqq 0.05$, $1.00 \leqq c \leqq 1.15$, $9.50 \leqq d \leqq 10.00$, and $0.005 \leqq e \leqq 0.020$ are satisfied.

3. The blue phosphor according to claim 1, wherein one of the two peaks has its top in a range of diffraction angle $2\theta=13.0$ to 13.2 degrees in the X-ray diffraction pattern obtained by measurement on the blue phosphor using an X-ray with a wavelength of 0.774 Å.

4. A light-emitting device comprising a phosphor layer containing the blue phosphor according to claim 1.

5. The light-emitting device according to claim 4, which is a plasma display panel.

6. The light-emitting device according to claim 5, wherein the plasma display panel comprises:
a front panel;
a back panel that is arranged to face the front panel;
barrier ribs that define a clearance between the front panel and the back panel;
a pair of electrodes that are disposed on the back panel or the front panel;
an external circuit that is connected to the electrodes;
a discharge gas that is present at least between the electrodes and contains xenon that generates a vacuum ultraviolet ray by applying a voltage between the electrodes through the external circuit; and
phosphor layers that emit visible light induced by the vacuum ultraviolet ray,
phosphor layers include a blue phosphor layer, and
the blue phosphor layer contains the blue phosphor.

7. The blue phosphor according to claim 1, wherein the blue phosphor is formed by firing a mixture of raw materials at a temperature in a range of 900 to 1600° C. for 1 to 50 hours in an atmosphere containing nitrogen gas, hydrogen gas in an amount of 0.1 to 10% by volume, and oxygen gas in an amount of $10^{-12}$ to $10^{-7}$ as partial pressure.

* * * * *

UNITED STATES PATENT AND TRADEMARK OFFICE
CERTIFICATE OF CORRECTION

PATENT NO. : 8,040,063 B2  
APPLICATION NO. : 12/595174  
DATED : October 18, 2011  
INVENTOR(S) : Okuyama et al.

Page 1 of 1

It is certified that error appears in the above-identified patent and that said Letters Patent is hereby corrected as shown below:

Column 9, line 56 (claim 1): "aBaO.bSrO.(1–a–b)EuO.cMgO.dAlO$_{3/2}$.eWO3" should read -- aBaO•bSrO•(1–a–b)EuO•cMgO•dAlO$_{3/2}$•eWO$_3$ --.
Column 9, line 57 (claim 1): "5 $9.00 \leq d \leq 11.00$" should read -- $9.00 \leq d \leq 11.00$ --.
Column 10, line 52 (claim 6): "phosphor layers" should read -- the phosphor layers --.

Signed and Sealed this  
Thirty-first Day of July, 2012

David J. Kappos  
*Director of the United States Patent and Trademark Office*